United States Patent [15] 3,700,922

Furman [45] Oct. 24, 1972

[54] FAST ACTING TURN-OFF CIRCUIT

[72] Inventor: Anatol Furman, Fairfax, Vt.

[73] Assignee: International Business Machines Corporation, Armonk, N.Y.

[22] Filed: Sept. 21, 1970

[21] Appl. No.: 73,925

[52] U.S. Cl. ..................307/246, 307/228, 307/270, 328/67

[51] Int. Cl. ..............................................H03k 17/60

[58] Field of Search..............307/228, 246, 268, 270; 328/67

[56] References Cited

UNITED STATES PATENTS

| | | | |
|---|---|---|---|
| 3,213,287 | 10/1965 | King | 307/246 X |
| 2,803,814 | 8/1957 | Bloser | 328/129 X |
| 3,289,103 | 11/1966 | Campman | 307/228 X |
| 3,510,803 | 5/1970 | Jacobson et al. | 307/246 X |
| 3,214,696 | 10/1965 | Hickey | 328/67 |
| 3,465,257 | 9/1969 | Currie et al. | 328/67 X |
| 3,484,624 | 12/1969 | Rasiel et al. | 307/228 X |
| 3,505,614 | 11/1970 | Marthe | 328/67 X |
| 3,566,307 | 2/1971 | Morris | 307/246 X |

*Primary Examiner*—Stanley D. Miller, Jr.
*Assistant Examiner*—R. C. Woodbridge
*Attorney*—Hanifin and Jancin and Francis J. Thornton

[57] ABSTRACT

A transistorized power gating circuit for providing a positive pull down of the capacitive load which derives from the load, via a feedback loop, the turn-off drive voltage required to discharge the capacitive load which drive voltage disappears as the load capacitance discharges. The circuit obviates the need of a continuous current flow to initiate the device used in discharging the load capacitance and eliminates the attendent turn-on delays associated with disabling direct coupled pull down circuits.

5 Claims, 3 Drawing Figures

INVENTOR
ANATOL FURMAN

BY Francis J. Thornton
ATTORNEY

FAST ACTING TURN-OFF CIRCUIT

BACKGROUND OF THE INVENTION

Field of the Invention

The present invention relates in general to driver circuits and particularly to a driver circuit wherein power consumption is reduced.

SUMMARY OF THE INVENTION

The present invention provides a circuit that utilizes the precharged load or output capacitance to initiate the discharge of the capacitance when such discharge is desired, thus reducing the delay time, the switching speed of the circuit and the power consumption of the circuit. Other and further features and advantages of the circuit will become apparent to ones skilled in the art from the following description taken in conjunction with the accompanying drawings in which

DESCRIPTION OF PREFERRED EMBODIMENTS

Figure 1:
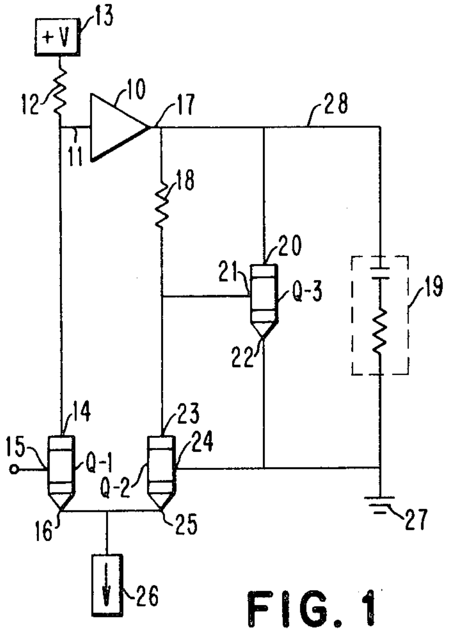
FIG. 1 is a diagrammatic illustration of a circuit embodying the present invention.

FIG. 1 illustrates in simplified form a NPN transistorized circuit that incorporates all the principle features of the present invention. The turn-off driver circuit shown here comprises a driver 10, having an input 11 connected to the collector 14 of a transistor Q-1 and to a positive voltage source 13 through a resistor 12. The output 17 of driver 10 is connected by a lead 28 to one end of a capacitive load 19, the collector 20 of transistor Q-3 and, through a resistor 18, to the base 21 of transistor Q-3 and the collector 23 of transistor Q-2. The other end of capacitive load 19, the emitter 22 of transistor Q-3 and the base 24 of transistor Q-2 are connected to ground 27.

The emitters 16 of transistor Q-1 and 25 of transistor Q-2 are connected together and are coupled to a negative current source 26, thus transistors Q-1 and Q-2 together comprises a current switch.

The operation of the circuit of FIG. 1 will be described in conjunction with the voltages illustrated in FIG. 2 and is as follows: Transistor Q-1 has initially a positive voltage logic pulse 30 impressed on its base 15 and is in a conductive state so that current flows through it from source 13 to source 26. When, at time T-1, logic pulse 30 begins to decrease, transistor Q-1 turns off and transistor Q-2 turns on. This causes the output 17 of of driver 10 and line 28 to rise to a positive level, as shown by curve 31, and to charge the capacitive load 19. Simultaneously, the base 21 of transistor Q-3 is held below the level necessary to turn on transistor Q-3 by the conductive state of transistor Q-2, clamping transistor Q-3 in a nonconducting state.

When at time T-2, pulse 30 again begins to go positive transistor Q-1 switches on and begins to conduct and transistor Q-2 switches off causing the base 21 of transistor Q-3 to begin to rise to a positive value shown by curve 32. This rise in the voltage level of base 21 of transistor Q-3 occurs because as transistor Q-2 turns off, line 28 remains positive by virtue of the delay time of driver 10 and the voltage stored in the capacitive load 19. As base 21 goes positive, transistor Q-3 begins to conduct and load 19 discharges through transistor Q-3 to ground 27 so that line 28 goes to ground potential as the capacitive load 19 discharges thus, the capacitive load 19 discharges itself by impressing its stored charge on the base 21 of Q-3. At time T-3, the load 19 is discharged and again ready to accept voltage.

The combination of resistor 18 and transistor Q-3 appears to load 19 as a single impedance having a value of R / (B + 1) where R is the value of resistor 18 and B is beta of transistor Q-3.

In one practical embodiment where the value of R is 2000 ohms and B is 49 the effective impedance to the load 19 as it begins to discharge is $$2,000 \text{ ohms} / 49 + 1 = 40 \text{ ohms}.$$

This means that if load 19 is 200 picofarads that it will discharge in approximately 20 nanoseconds.

It is of course understood that this time can be either increased or decreased by modifying the impedances of the circuit.

The positive feedback of the voltage carried by load 19 thus not only provides a turn-off drive of the load by discharging itself through the impressment of its own stored charge on base 21 of transistor Q-3 but also eliminates the turn-on delay normally associated with the drive circuits known to the prior art.

Figure 3:
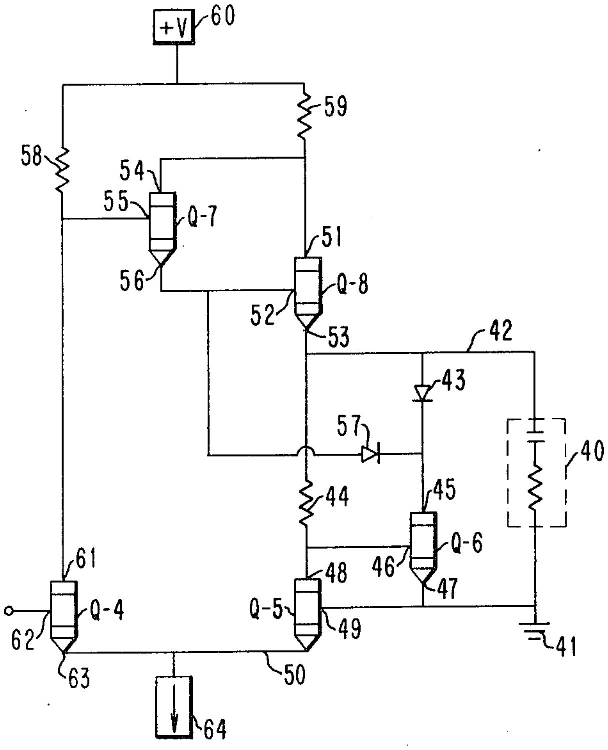

FIG. 3 is a more specific embodiment of the invention.

The circuit shown in this embodiment operates in substantially the same manner as does the circuit in FIG. 1. Here, however, the circuit comprises a capacitive load 40 connected between ground 41 and line 42 which is in turn connected to the anode of diode 43, the emitter 53 of transistor Q-8 and through resistor 44 to the base of 46 of transistor Q-6 and to the collector 48 of transistor Q-5. The cathode of diode 43 is connected to the collector 45 of transistor Q-6 and the cathode of diode 57. The anode of diode 57 is connected to the emitter 56 of transistor Q-7 and to the base 52 of transistor Q-8, whose collector 51 is connected to the collector 54 of transistor Q-7 and through resistor 59 to a positive voltage source 60 which is also coupled through resistor 58 to the base 55 of transistor Q-7 and collector 61 of transistor Q-4.

By coupling the emitters 63 and 50, of transistors Q-4 and Q-5, respectively, together and to a negative current source 64 and supplying a logic input pulse to the base 62 of transistor Q-4 while the base 49 of transistor Q-5 is connected to the emitter 47 of transistor Q-6 and ground 41, transistors Q-4 and Q-5 act as a current switch.

In describing the operation of this embodiment of the invention, the voltage pulses of FIG. 2 will again be utilized. When a positive voltage logic pulse 30 is impressed upon the base 62 of transistor Q-4 it turns on and current flows through it from voltage source 60 to current source 64. When at time T-1 logic pulse 30 begins to decrease, transistor Q-4 turns off and transistor Q-5 turns on. When transistor Q-4 turns off, base 55 of transistor Q-7 becomes positive and that device turns on. The turning on of transistor Q-7 causes the base 52 of transistor Q-8 to become positive and transistor Q-8 also turns on to conduct current from source 60, through resistor 59, to line 42 to charge capacitive load 40. As line 42 rises to a positive level, as shown by curve 31, the base of 46 of transistor Q-6 is held below its turn-on voltage by the conductive state of transistor Q-5, clamping transistor Q-6 in a nonconducting state. When at time T-2 pulse 30 again begins to go positive, transistor Q-4 switches on and begins to conduct, transistor Q-5 switches off causing the base 46 of transistor Q-6 to begin to rise to a positive value shown by curve 32 and transistor Q-6 begins to conduct. Simultaneously the base 55 of Q-7 is driven below its turn-on level and transistor Q-7 turns off which now starts to turn off transistor Q-8.

As previously mentioned the rise in the voltage level of base 46 of transistor Q-6 occurs because as transistor Q-5 turns off, line 42 remains positive by virtue of the delay time in the output of transistor Q-8 and the voltage stored by the capacitive load 40. As base 46 goes positive, Q-6 begins to conduct, this causes diode 57 to conduct because of the voltages imposed on diode 57 with respect to base lead 52 and the collector 45 of transistor Q-6. As diode 57 begins conducting it increases the drain on the base of transistor Q-8 to cause Q-8 to turn off faster than it normally would do so. Eventually, the voltages impressed upon the anode of diode 57, drop to a value below that which holds diode 57 in a conductive state. When this occurs, diode 57 turns off and diode 43 turns on. When diode 43 begins to conduct the stored capacitive charge in load 40 discharges itself through transistor Q-6 and line 42 goes towards ground potential. Thus the capacitive load 40 discharges itself by impressing its stored voltage on the base 46 of transistor Q-6. The positive feedback of the voltage carried by load 40 thus not only provides a turn-off drive of the load by discharging itself through the impressment of its own stored charge on base 46 of transistor Q-6 but also eliminates the turn-on delay normally associated with the drive circuits known to the prior art.

As indicated above in this particular embodiment the addition of diodes 43 and 57 aids substantially in reducing the delay encountered in turning off transistor Q-8.

It is to be noted that transistors Q-7, Q-8 and diodes 57 and 43 are substantially substituted for the driver circuit 10 of FIG. 1.

Figure 2:
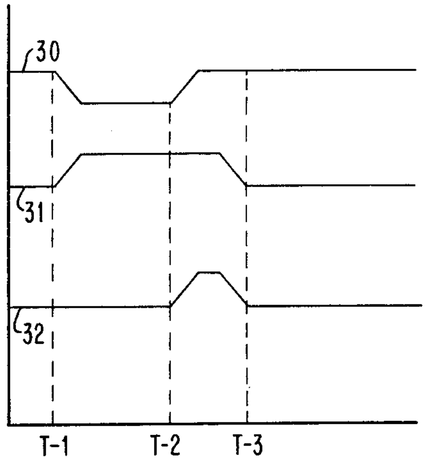
FIG. 2 illustrates the various electrical signals at selected points in the circuit, and FIG. 3 sets forth a different embodiment of the present invention.

It is to be noted that the embodiments of FIG. 1 and FIG. 2 are both well adapted to operate in the desired manner and both reduce the power required to operate such circuits.

Although the invention has been described in conjunction with NPN transistors, it should be apparent that by reversing the applied voltages that the circuits will also be operable with PNP devices.

It should also be apparent to those skilled in the art that circuits employing the present invention can be designed that utilize FET devices.

While the invention has been particularly shown and described with reference to preferred embodiments thereof, it will be understood by those skilled in the art that various changes in form and detail may be made therein without departing from the spirit scope of the invention.

What is claimed is:

1. A self discharging capacitive load circuit comprising a capacitive load, charging means, means for coupling the charging means to the load during a first period to supply charge to said load and for isolating the charging means from the load during a second period, a discharge path for the load, and means for preventing current flow through the discharge path during said first period and for discharging the load through the path during the second period, said discharge path comprising a switching device having first, second and third terminals, the first and second terminals connected to opposite ends of said load, and its third terminal coupled to said charged load.

2. A fast acting turn-off circuit having reduced power consumption comprising a capacitive load connected in parallel with a discharge semiconductor, a driver for supplying charge to said load and coupled to said semiconductor, switching means for turning off said driver and feedback means from the load for placing the semiconductor in a conductive state to discharge the charge stored in said load.

3. A self discharging capacitive load circuit comprising a driver having its input connected to the collector of a first transistor and through a first impedance to a voltage source and its output coupled to a capacitive load, the collector of a second transistor and through a second impedance to the base of the second transistor and the collector of a third transistor, the base of the third transistor and the emitter of the second transistor being connected to ground, the emitters of the first and third transistors being coupled together and to a current source, and means for supplying an input signal to the base of said first transistor.

4. A self discharging capacitive load circuit comprising a voltage source coupled through a first impedance to the collector of a first transistor and the base of a second transistor and through a second impedance to the collector of the second transistor and the collector of a third transistor, the emitter of the second transistor being connected to the base of the third transistor and to the anode of a first diode, the emitter of the third transistor being coupled to the anode of a second diode and to the capacitive load, and through a third impedance to the collector of a fourth transistor, and the base of a fifth transistor, the cathode of the first diode being connected to the cathode of the second diode and the collector of the fifth transistor, the emitter of the fifth transistor being connected to the base of the fourth transistor and to ground, the emitters of the first and fourth transistor being connected together and coupled to a current source and means for impressing a time varying signal on the base of the first transistor.

5. A self discharging capacitive load circuit comprising a capacitive load, charging means, means for coupling the charging means to the load during a first period to supply charge to said load and for isolating the charging means from the load during a second period, a discharge path for the load, and means for preventing current flow through the discharge path during said first period and for discharging the load through the path during the second period, said discharge path comprising a transistor having its emitter and collector connected to opposite ends of said load, and its base coupled to said charged load.

* * * * *